PROCESS FOR INFORMATION STORAGE AND RETRIEVAL

Filed Oct. 31, 1967 3 Sheets-Sheet 1

INVENTORS
CHE CHUNG CHOW
CHARLES D. REILLY

BY James H. Ryan
ATTORNEY

INVENTORS
CHE CHUNG CHOW
CHARLES D. REILLY
BY James H. Ryan
ATTORNEY

INVENTORS
CHE CHUNG CHOW
CHARLES D. REILLY
BY James H. Ryan
ATTORNEY

United States Patent Office 3,546,675

Patented Dec. 8, 1970

3,546,675

PROCESS FOR INFORMATION STORAGE AND RETRIEVAL

Che Chung Chow and Charles D. Reilly, Wilmington, Del., assignors to E. I. du Pont de Nemours and Company, Wilmington, Del., a corporation of Delaware

Filed Oct. 31, 1967, Ser. No. 679,346

Int. Cl. G01d *15/12;* G11b *5/02*

U.S. Cl. 340—174.1 14 Claims

ABSTRACT OF THE DISCLOSURE

Claimed are a pyromagnetic information storage and retrieval process and apparatus capable of operating at a high packing density. A magnetic storage member, e.g., tape, is bit-wise heated above the Curie temperature of the magnetic material within it as by a laser or electron beam and is then cooled below the Curie temperature in the presence of a magnetic field. The magnetically stored information is subsequently bit-wise read out by rapidly heating the magnetized storage member to a temperature approaching but always remaining below the Curie temperature of the magnetic material in the tape and separately sensing the magnetized bits.

FIELD AND BACKGROUND OF THE INVENTION

Figure 1:
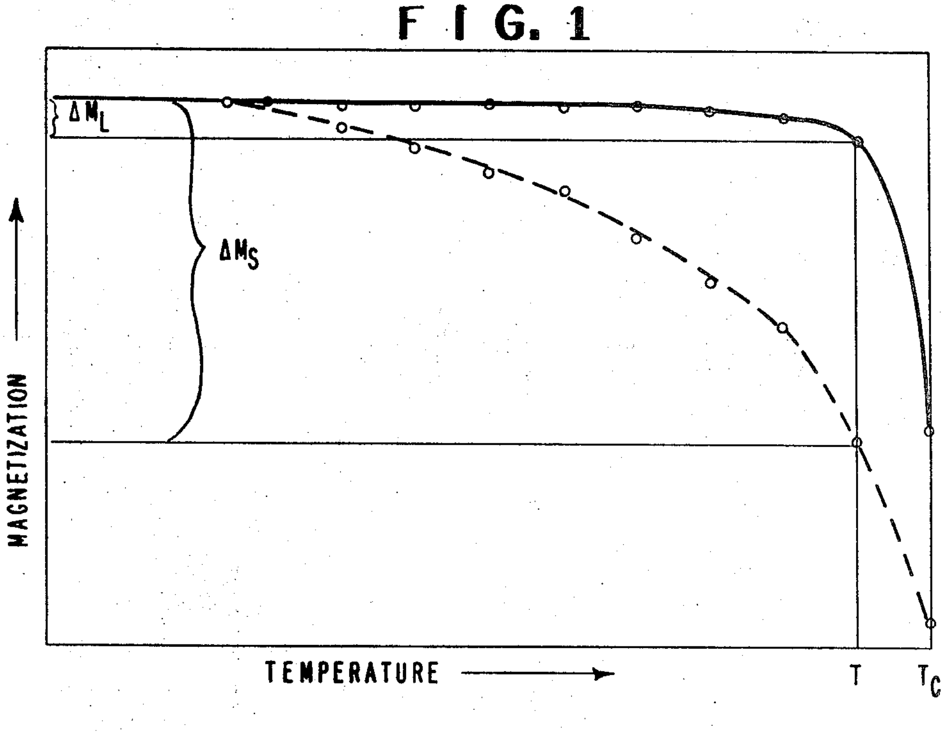

The present invention primarily relates to, and has as its principal object provision of, a novel pyromagnetic, or thermomagnetic, technique and apparatus for reading in and reading out, generally nondestructively, magnetically stored information.

Magnetic recording systems are basic items of commerce and represent a significant portion of the means by which the constantly expanding need for information storage and retrieval is satisfied. These recording systems, in which information is recorded by passage of a recording member past selectively pulsed magnetic heads, exhibit several deficiencies. Most important, perhaps, is the fact that the packing factor is limited by the necessary geometry of the heads. The packing factor may be expressed in terms of "bits" of information storage per unit dimension of the recording member, i.e., the number of discrete magnetized or unmagnetized spots (depending on whether the background is unmagnetized or magnetized) per unit area. Destructive interference results when the dimensions of a to-be-recorded bit are finer or more detailed than the dimensions of the means whereby read-in or read-out of the bit is attempted.

Another important defect in current magnetic recording systems is that the transport relationship of both the recording and recorded members with respect to the heads requires extremely close spacing to assure as high as possible resolution and packing factor. Thus, necessarily, at both stages the recording and recorded members must pass in extremely intimate contact with the heads. The result is significant and undesirable wear of the recording and recorded members (as well as of the heads), indeed of such magnitude as to ultimately result in the destruction of the recorded member and the heads as usable items. The wear problem is magnified appreciably because of the above-discussed limiting packing factor resulting from the necessary geometry of the heads since, with this limiting packing factor, to approach a reasonable bit input and output per unit function of time, tape transport speeds are necessarily relatively high.

The above disadvantages are particularly outstanding and may be exemplified with respect to magnetic tape television recording systems which form a very significant part of all commercial television. To attain anything approaching the resolution and packing factors desired, tape to head speeds presently are of the order of 200 i.p.s. or more, and at these speeds, to insure good contact, the tape head has to dig into the passing tape at least two mils. Heat generation due to friction is thus large and mechanical wear to both the tap and the head, excessive. Under such conditions for any effective operating life the surface of the tape must be extremely smooth; any surface imperfections or nodules on the magnetic material cause severe loss of signal. Furthermore, large quantities of tape must be used because of the high speeds and relatively low attainable packing factor, e.g., up to 176 cm.$^2$/sec., for TV studio use.

In accordance with the present invention, there is provided a new pyromagnetic technique for reading in and reading out magnetically recorded information and a process of information storage and retrieval based thereon which permits an extremely high density of recorded information per unit area, i.e., a high packing factor, and at the same time permits retrieval of the said recorded information completely nondestructively with respect to the recorded magnetic recording member. In this technique, the magnetic recording members are capable of being read-in thermally and after read-in being activated thermally and sensed magnetically with, in both instances, extremely high resolution, sensitivity, and high packing factor.

Effects of heat on the magnetic properties of materials have, of course, been noted previously. Thus, Sims et al., in U.S. Pat. 2,793,135 (1957) magnetize selected portions of a printing surface by applying heat gradients thereto in the presence of a magnetic bias. Burns, Jr. et al., in U.S. Pat. 2,915,594 apply a radiant energy source, modulated in accordance with the intelligence to be recorded, to a uniformly magnetized recording member to selectively bit-wise demagnetize the recording member, then cool said member in the absence of a magnetic field. A. G. Chynowith, "Pyromagnetic Effect: A Method for Determining Curie Point," J. Appl. Phys., 29, No. 3, pp. 563–65 (1958) discloses a dynamic process for determining the Curie point of a crystal "with some precision" by flashing light thereinto and measuring the transient changes in magnetization intensity. More recently, Daly et al., in copending, coassigned, U.S. patent application, Ser. No. 464,811 (June 20, 1965), now Pat. No. 3,311,054, show the transfer with amplification of weak signals recorded on one magnetic tape to a second tape by heating the second tape above the Curie point of the magnetic material it contains and cooling in the weak field of the first tape. Sziklai in U.S. Pat. 2,857,458 (1958), furthermore, impinges an electron beam on a recording member while magnetically exciting the medium.

SUMMARY OF THE INVENTION

In contradistinction to art such as that noted, the present invention, in its overall aspect, is a two-step, i.e., read-in and read-out, process for information storage and retrieval in which:

(1) An unmagnetized magnetic recording member, usually a magnetic tape containing a relatively hard magnetic material, is (a) first bit-wise magnetized in accordance with intelligence to be impressed thereupon by bit-wise heating to a temperature near or above, i.e., in the vicinity of, the Curie point of the magnetic material within the tape by means of a focussed heat source such as a laser or electron beam, and (b) then allowed to cool while in a magnetic field; and subsequently (2) After bit-wise magnetization, (a) the tape is bit-wise exposed to a radiation source such as a laser or electron beam and the temperature of the bits rapidly raised to a value approaching but not exceeding the Curie temperature of the magnetic material within the bit and (b) the changing magnetic field around a magnetized bit is suitably sensed and thereby differentiated from a non-magnetized bit.

It will be appreciated that variations in the just described process are possible. For example, numbered steps (1) and (2), above, can be performed separately and not in conjunction with each other. Because of the smallness of the bit size, however, and the smallness and intensity of the heat source required in both read-in and read-out steps, the overall information storage and retrieval system is preferably carried out as described.

In other variations, the pyromagnetic differentiation of the magnetization of the bits from the background magnetization need not be exactly that of numbered step (1). For instance, the recording member on the tape need not initially be unmagnetized. Instead, it can be uniformly magnetized and then selectively demagnetized by bit-wise heating above the Curie temperature and then cooling in the absence of any magnetic field, the resulting bits of intelligence being unmagnetized after such steps. Alternatively, the tape can be initially uniformly magnetized and selectively heated near the Curie temperature and cooled in the presence of a direct current reverse bias field. In this case, the bits are magnetized in a reverse polarity to that of the original and can be detected (cf. Example 8).

Furthermore, numbered step (2) read-out, need not be accomplished during the heating step; it can be carried out after heating as the bit cools and returns to its initial magnetization.

It will be further appreciated that proper control of the energy beam positioning allows access to any desired position on the recorded member, i.e., allows random access in read-in as well as read-out, as is desirable for example in correcting or updating previously recorded information, or in reading out selected information only.

Further, an entire intelligence can be read-in at one time by processes such as those taught in Belgian Pats. 672,017 and 672,018 or transferred from a tape or other magnetic recording member as described, for example, by M. Camras and R. Herr, Electronics, 22, (December 1949), p. 78.

THE DRAWINGS

Figure 2:
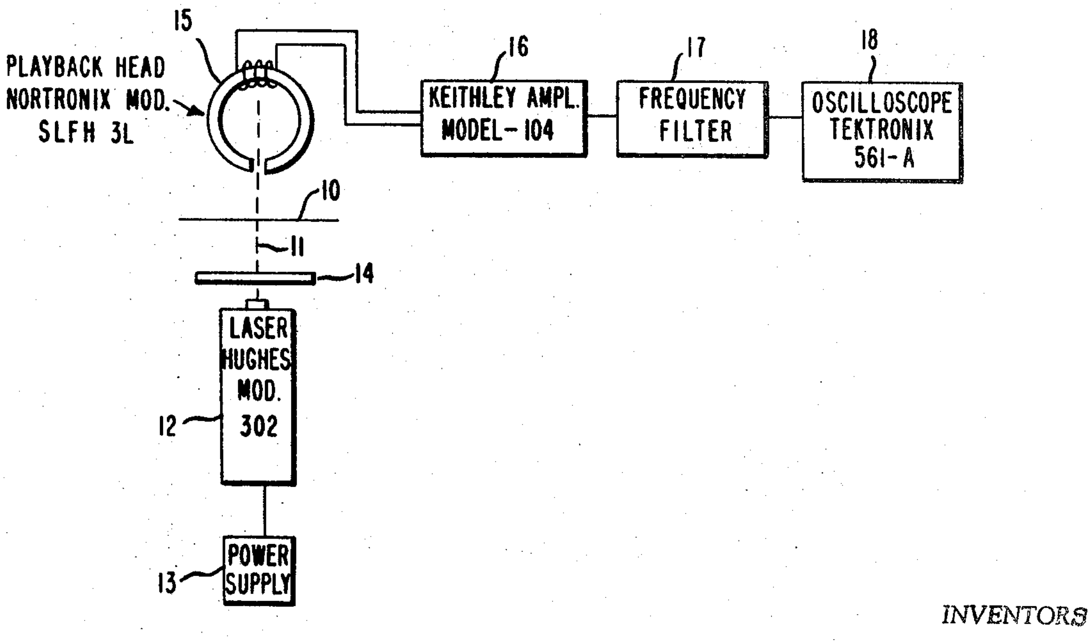
Figure 3:
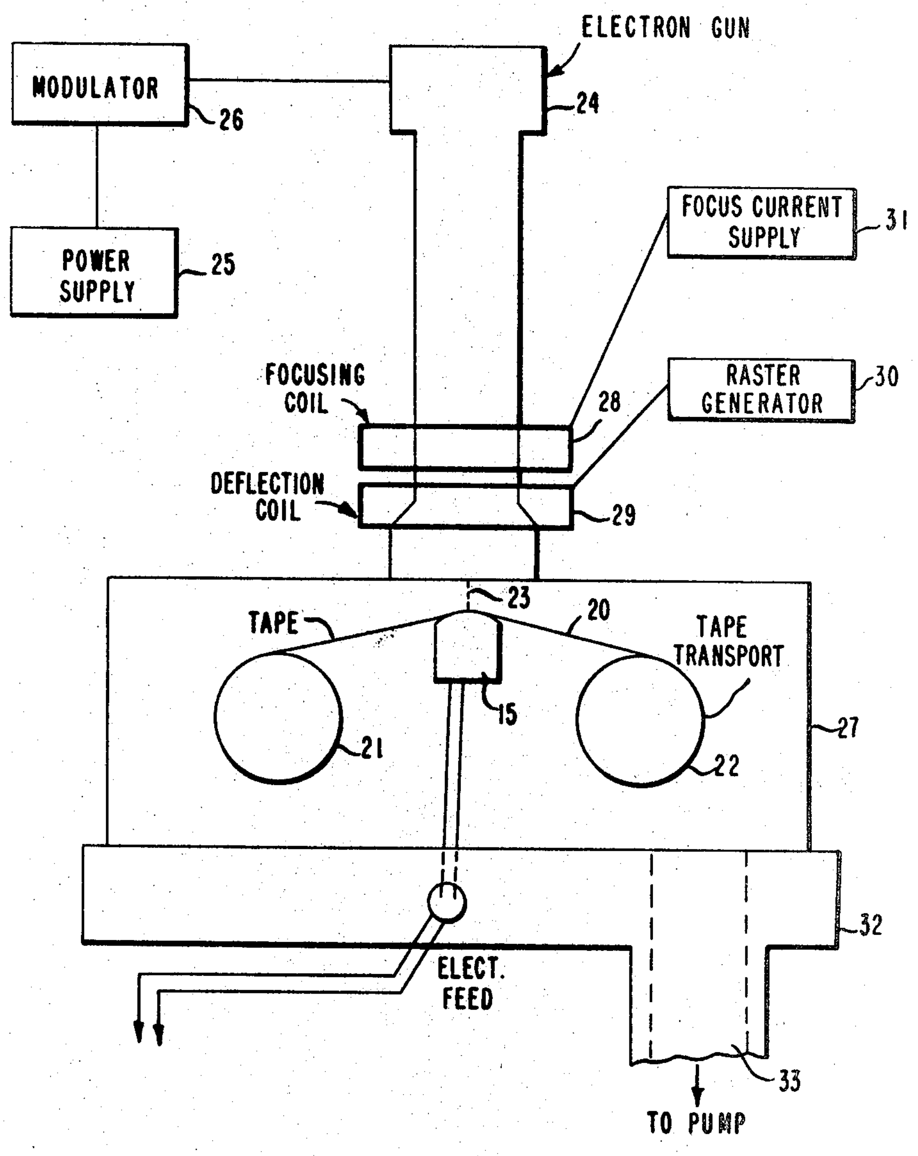
Figure 4:
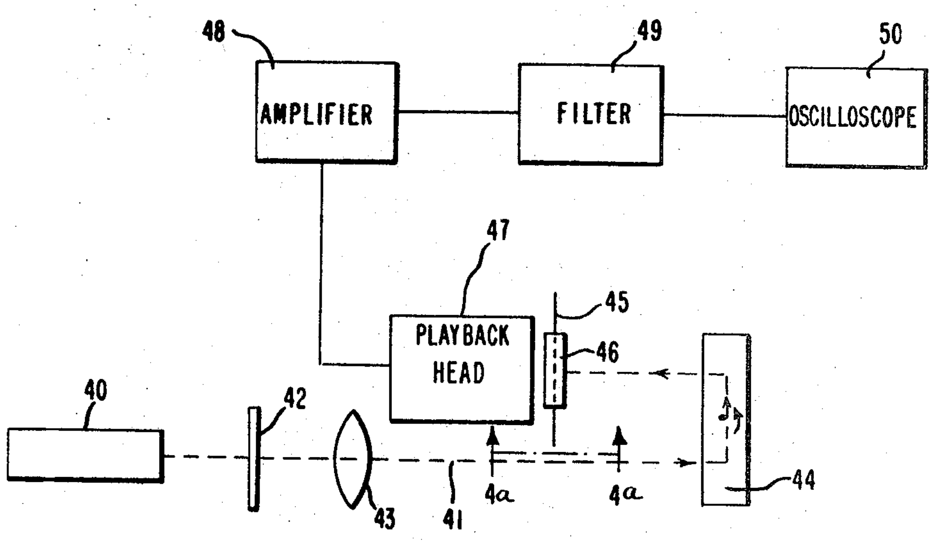
Figure 4A:
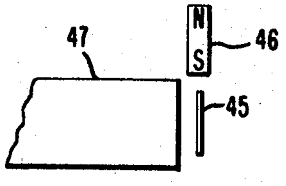

The invention will be understood in more detail from the remainder of the specification and from the drawings in which:

FIG. 1 shows the magnetization of a magnetic material plotted against the temperature. $T_c$ represents the Curie temperature, i.e., the temperature at which remanent magnetization vanishes. $\Delta M_S$ is the change in magnetism which determines the signal. $\Delta M_L$ is the change in magnetism which determines signal loss. Further discussion of FIG. 1 is given below in connection with read-out;

FIG. 2 represents apparatus that may be used to test a bit, or spot, on a magnetic tape for magnetization (see Example 1, below). In FIG. 2, a magnetic tape 10 is shown exposed to the radiation or beam 11 of a ruby laser 12 connected to a power supply 13. The beam is attenuated with a neutral density filter 14. Changes in the magnetic field of a magnetized portion of the tape caused by heat from the laser beam are sensed by magnetic head 15, which produces a current passed through amplifier 16 and frequency filter 17 and displayed by oscilloscope 18;

FIG. 3 is a view of a form of apparatus alternate to that of FIG. 2 employing electron gun 24 rather than a laser as the heat source (see Example 6, below). Here tape 20, carried on tape transports 21 and 22, is exposed to the intensity-modulated electron beam 23 from gun 24 operated from a voltage derived from power supply 25 and modulator 26. Tape 20 is held within vacuum glass viewing chamber 27 and the electron beam 23 focussed thereon by means of a focussing coil 28 with current supply 31 and controlled by the deflection coil 29 with a raster generator 30. For read-out, the magnetic head 15 of FIG. 2 connected as in that figure and held within vacuum chamber 27 is empolyed. Vacuum chamber 27 is physically supported on a aluminum base 32 connected to a vacuum pump through hollow tube 33;

FIG. 4 is a top plan view of apparatus, quite similar to that of FIG. 2, which can be used for both read-in and read-out (see Example 7, below) with a laser. In FIG. 4, laser 40 produces beam 41 which is attenuated by glass filter 42 and focussed by lens 43 and directed onto rotating glass prism 44 (not in scale). The prism scans the laser beam and directs it onto tape 45. For read-in purposes magnet 46, indicated by the block in dotted lines in the figure, is placed over the tape (and above the general plane of the drawing). For read-out, magnet 46 is removed from the system and that part of the system after the tape is employed. The last part of the system consists of magnetic head 47, amplifier 48, frequency filter 49, and oscilloscope 50. FIG. 4*a* is a section along line 4*a* of FIG. 4 showing the arrangement of tape 45, magnet 46 and magnetic head 47.

DETAILS OF THE INVENTION

The present process involves the imagewise magnetic ordering of a magnetic stratum in or on a suitable support with a conventional energized magnetic read-in head, or by bit-wise exposure to a suitable energy imaging means such that the magnetic material is heated in the vicinity of its ordering, i.e., Curie temperature, and after cooling in a magnetic field is subsequently sensed by joint bit-wise exposure to both energy means and magnetic sensing means, said energy means being insufficient to permanently change magnetic ordering.

The magnetic stratum of the recording member can be first uniformly magnetized and then imagewise demagnetized by said energy imaging means; or it may be unmagnetized and imagewise magnetized by said exposing energy means operating jointly with a uniform magnetic bias of insufficient strength alone to achieve the magnetic ordering; or it may be uniformly magnetized and reverse polarity magnetized by bit-wise exposure to imaging energy means, coupled with a uniform magnetic bias in the opposite direction to the original magnetizing field and of insufficient strength alone to achieve the reversal. The energy means firstly must be absorbed by the magnetic species in the magnetic stratum of the recording member and must be of sufficient intensity with a sufficiently long exposure time to heat the magnetic species into the area of its ordering temperature. Preferred energy sources provide electromagnetic radiation in the visible, UV, or IR portions of the spectrum, or are electron beams. Convenient sources of the exposing means are the conventional sources of radiant energy, e.g., arc lamps and lasers, and electron beams. Because of the higher intensity coupled with possible finer resolution, the laser and electron beam are generally preferred and the lasers are especially useful also in the read-out step.

More precisely, the invention comprises a method for information recording and retrieval permitting information bit densities greater than $10^5$ bits/sq. cm. and comprising recording, i.e., reading-in, using thermal energy from an optical or electron beam sufficient to heat the magnetized or magnetizable portion of a magnetic recording medium in the vicinity of the ordering temperature thereof, alone or in combination with a magnetic bias, said (thermal) beam being scanned across said magnetic recording medium in a direction transverse to the direction of movement of said recording medium; and retrieving, i.e., reading-out, such recorded information by heating the imaged, i.e., recorded, magnetized, demagnetized, or reverse polarity magnetized portions of the recorded medium, to a temperature less than the ordering temperature thereof by means of an optical or electron beam scanned transversely corresponding to the recorded information configuration, and detecting the resulting pyromagnetic flux changes bit-wise by a magnetic flux-change sensing means.

It will be appreciated that modulation of the intensity of the energy beam and consequent recording of the information can be accomplished in more than one way. Thus, in the case of a laser energy beam, the information to be recorded can directly modulate the excitation, as for example, the electrical discharge current of a gas laser, causing it to vary from a maximum intensity sufficient to heat the recording member above its Curie temperature, to a minimum intensity insufficient to change the magnetic state of the recording member. Alternatively, a constant laser output can be later modulated by any one of several devices known in the art, for example, a Kerr cell, the cell transmission being modulated through an applied voltage corresponding to the information to be recorded.

As a further alternative, it is possible to bit-wise record by using a constant or unmodulated energy beam but to modulate the magnetic field applied to the record member. That is, the polarity of recorded bits in the record member is controlled by the sense of the magnetic field in which the bits cool after being heated in the vicinity of their ordering or Curie temperature by the energy beam. Note that resolution is not limited by the head gap or geometry, but is controlled by the size and positioning of the energy beam.

The principles governing read-out are demonstrated in terms of FIG. 1. The broken line represents the magnetization measured at temperature while the solid line represents the magnetization measured at ambient temperature after heating to temperature and cooling to ambient temperature. During read-out by this pyromagnetic method it is necessary to detect time changes in flux, i.e., $d\phi/dt$. These changes are determined by and substantially proportional to the time changes in magnetization, i.e., $dM/dt$. It can be seen from FIG. 1 that at a given temperature, T, the sensitivity of the read-out signal is represented by $dM_S/dt$, which should be maximum for optimal signal. The loss of signal upon returning to ambient temperature after read-out is represented by $\Delta M_L$, which should be as small as possible for non-destructive read-out. It can be appreciated that greatly increased sensitivity over conventional magnetic read-out is achieved, because the change in magnetization with time is accomplished by bit-wise heating of the magnetic record and is limited only by the realizable modulation rates of the required energy beam. Modulation of electron beams or light beams at 100 mHz. or higher are easily achieved, giving flux reversals of 0.005 microsecond or shorter. Thus rate of read-out need not be the same as rate of read-in. It can be further appreciated for the purposes of the present invention and in light of the above considerations that the exact slope of the magnetization curve is not important, so long as the magnetic material employed has an appreciable remanent magnetization initially present, i.e., the magnetic material employed is a hard magnetic material. In addition resolution is not limited by the head gap or geometry but is determined by the size and positioning of the energy beam.

Read-out requires (1) an energy means applied to the recorded medium sufficient to cause appreciable change in saturation magnetization (with temperature) and (2) a sensing means for detecting magnetization changes. Either the sensing or energy means or the position of the recording medium must change with time to provide a time sequence of signals corresponding to the spatial sequence of information of the record. All three, of course, can move if desired: e.g., stationary tape, stationary magnetic head, scanning laser beam; e.g., moving tape, stationary magnetic head, stationary laser beam; e.g., moving tape, composite sequentially addressed magnetic head, stationary laser beam.

A preferred embodiment of read-out is: moving tape past a magnetic read head with light (laser) beam scanning along head gap (transverse to tape movement). This process permits (1) the use of the same light beam for read-in and -out, (2) high resolution in both tape and transverse direction, (3) sensitive detection means, and (4) energy means capable of high resolution, adequate energy, and position modulation at high read-out speeds.

Sensing means must detect time changes in flux, $d\phi/dt$. A preferred means is the regular recording or read-out head because of its resolution and density, but a single loop of wire will convert $d\phi/dt$ into a sensible voltage. Thus various geometries, from a large solenoid surrounding the record member, to a single wire associated with a single bit, can be employed.

Read-out sensing means can also consist of a field detection device, e.g., a Hall effect probe, with changes in output voltage (proportional to magnetic field) being effected by energy beam means.

The exposure involved can vary widely in intensity and duration. The only common requirement is that sufficient energy be available during imagewise exposure so that the individual bits are driven above the Curie temperature of the magnetized component in the non-image areas. The only other exposure requirements should be obvious to those skilled in this art, but to enumerate some requirements specifically, the exposures should be such that the low heat-conducting support and binder or matrix, if the latter is used, are not damaged physically, i.e., are not heated sufficiently high to alter significantly the physical properties thereof. Thus, insofar as the composite in which the copy is to be made, i.e., the support and magnetic stratum therein and/or thereon containing the hard, magnetic material, should not be significantly altered in its mechanical or physical properties during the exposure needed to imagewise demagnetize the magnetized stratum.

For reasons of greater efficiency in the sense of the function of read-in bit with time, the radiant energy used should be of such intensity that the exposure time will be at the minimum. This not only serves to increase speed of replication but also decreases any possible tendencies for undesirable effects arising in the binder or the substrate. Normally, the radiant energy used in the exposure will lie in the range 0.001–2.0 watt-sec./cm.$^2$ and normally will be in the narrower range 0.01–0.5 watt-sec./cm.$^2$. Usually the duration of exposure will range from ten nanoseconds to as long as 100 milliseconds, and an average range of duration of exposure will be 0.001–1 millisecond.

The energy requirements imposed on the energy source for ferromagnetic chromium oxide particles, a preferred magnetic material for use in the invention, may be reduced by approximately one-half the room temperature values at 75° C., one-fifth the room temperature values at 100° C., and one-twentieth the room temperature values at a temperature just short of the Curie point by appropriate thermal biasing. The thermal biasing may be applied up to any temperature below the Curie temperature of the particular hard magnetic imaging particles used. Thus, for unmodified $CrO_2$, the Curie temperature is near 116° C. Curie temperatures in the range of 70° C.–150° C. are attainable with modified $CrO_2$. It will be appreciated that the use without thermal biasing of a modified chromium dioxide with a Curie temperature near 70° C. would be approximately equivalent to thermally biasing at about 75° C. the usual unmodified chromium dioxide with Curie temperature of near 116° C. The particular choice of thermal biasing conditions, of course, will depend on the decrease of magnetic properties with increasing temperature for the hard magnetic particles involved, and the temperature limitations imposed by stability of the nonmagnetic binder, if used, for the magnetic particles, and of the supporting member in which the particles are coated. Thermal biasing may be established by direct contact with a heated plate or by other obvious means.

As will be illustrated in greater detail in the more specific exemplifications of the present invention, a most convenient source of radiant energy in the power ranges needed and in the fast exposures desired is found in the laser, many varieties of which are available commercially.

The process of this invention permits recording and read-out of a gray scale corresponding to the magnitude of remanent magnetization. Resolution is limited only by the fineness of the magnetizable particles and their magnetic properties.

The methods for reading-in a desired image, message, or pattern into the thus described magnetized stratum vary widely, and, in part at least, are a function of the nature of the exposing radiation being used. Thus, with the more sophisticated exposing radiation means, such as electron beam radiation and laser radiation, the method of modulating the exposing radiant energy to afford the desired imagewise read-in can be as simple as using a pattern of the desired message fabricated from material which will not permit passage of these types of exposing radiation, e.g., to give a simple, a block letter cut in, for instance, metallic lead foil. Conversely, with these possibly more sophisticated exposing radiation means, equally sophisticated modulating means can also be used. Thus, for instance, the laser beam can be focussed and moved in the desired image pattern by suitable electronic means, or the electron beam can also be focussed and moved by allied circuitry means in the desired image pattern, in both instances reading-in the desired message directly into the copy sheet in the desired pattern. The electron beam exposing radiation means is particularly amenable to circuit coupling, to the so-called raster read-in technique permitting direct pictorial half-tone representation in the copy-member.

In the just-discussed techniques, the modulating means, i.e., the image- or message-forming control, by which the exposing radiation achieves imagewise magnetic ordering in the copy member can be regarded as being directly coupled to the exposing radiation means; therefore, read-in is essentially direct. The same techniques can also be effected in the same descriptions equally well applied in the actinic radiation field with a suitably coupled optical system capable of patternwise controlled optical read-in. Generally speaking, these direct read-in techniques will be of more significance for data storage, information storage and retrieval, etc., and other methods wherein a preferred method of operation will involve the use of a binary digit code.

Desirably, the material capable of magnetization to the hard magnetic state in the thermomagnetic recording members of the present invention will be of particle size of one micron and under, although as is true of most such magnetizable materials, by their very nature they tend to agglomerate and, accordingly, frequently the individual unit dimensions of any one magnetizable area will have agglomerates possibly in the range up to ten mils. In recording and copying techniques, the resolution and packing factor are direct functions of the particle size of the working component involved. Thus, a bit cannot be efficiently recorded that is smaller than the particle of the working component through which it is to be recorded. Accordingly, the smaller and more uniform the particle size of the material to be magnetized, the better. Preferably, these particles should be in the range 0.01 to 5 microns, and most especially 0.1 to 2.0 microns. These numbers refer to the lengths of acicular particles. In spherical particles, dimensions (diameters) would generally be smaller.

The magnetizable material must be capable of magnetization such that it exhibits an energy product $(BH)_{max}$ of 0.08–8.0 gauss oersteds$\times 10^6$, a remanence B of 500–21,500 gauss, a coercivity $H_c$ of 40–6000 oersteds, and a Curie-point temperature of 0–1200° C., preferably from 25°–500° C. Desirably the magnetizable material should also have as high a saturation magnetization, i.e., $\delta_s$, as is possible, consonant with the just-recited desirable property range. Suitable specific illustrative examples of the magnetizable materials useful in the present invention will be given later. An especially preferred one, because of three desirably interwoven properties, i.e., relatively high coercivity, relatively high remanence at room temperature, and a conveniently accessible Curie temperature, is ferromagnetic chromium oxide. As is well known, ferromagnetic chromium oxide is chromium dioxide in which the chromium and oxygen may vary slightly from the stoichiometry of $CrO_2$.

Suitable materials capable of use in the present process to be magnetized to the hard magnetic state and then selectively demagnetized include, in addition to $CrO_2$, any of the well-known hard magnetic materials. Of course, in the case of those with relatively high Curie temperatures, care must be used naturally in selecting the binder, i.e., the matrix in which they are to be dispersed, and also the substrate on which the magnetizable stratum is to be carried. However, such selection is believed to be well within the skill of the art.

Further, with respect to the magnetic component of the present compositions, many materials are useful. Preferably, they should not only exhibit hard magnetic properties, low Curie temperature, high remanence and high coercivity, but also physically should be capable of formulation by conventional techniques into relatively fine particles, preferably acicular, at dimensions approaching single domain dimensions.

A number of factors contribute to the designation of a material as "hard" or "soft" magnetically. Many magnetic materials usually designated as "soft" will show high coercive force when prepared as fine particles. Geometrical factors, including size and shape of the particle, are important. For example, iron is normally considered a "soft" magnetic material with a coercivity of a fraction of an oersted. However, small iron particles composed of single domains with lengths great compared to their diameters can be expected to show coercivities of the order of $10^3$–$10^4$ oe. In this case, high coercivity is due to shape anisotropy. For other materials, such as manganese bismuthide or cobalt, high coercivity for single domain particles may be the result of magnetocrystalline anisotropy arising from an easy direction of magnetization along a particular crystalline direction. Even fine nickel particles should show a high coercivity under uniaxial stress. Many normally "soft" magnetic materials not in single domain form can be made to exhibit a high coercivity after being subjected to cold work or other similar treatments designed to introduce defects or internal strains which serve to pin or block movement of domain walls. Further discussion of "Hard Magnetic Materials" can be found in the article by the title by E. P. Wholforth, Advances in Physics, supplement to Philosophical Magazine, 8 (April 1959), pp. 87–224, and in the book by R. M. Bozorth on "Ferromagnetism," D. Van Nostrand and Company, Princeton, N.J. (1951), particularly the section on fine particles, pp. 828–834. "Soft Magnetic Materials" are also discussed widely in the literature, e.g., E. W. Lee and R. L. Lynch, Advances in Physics, supplement to Philosophical Magazine, 8 (July 1959), pp. 293–348.

Representative magnetic materials suitable for use in the invention include such materials as the ferrites, e.g., $Mn_{1.5}FeTi_{0.5}O_4$, $MnFe_2O_4$, $Fe_3O_4$, $CoFe_2O_4$, $NiFe_2O_4$ and $Li_{0.5}Fe_{2.5}O_4$, the Alnicos®, the Lodexes®, Fe, Co, Ni and their alloys and compounds, e.g., $Fe_3C$, $Fe_{20}C_9$ ($\chi$-iron carbide), $Fe_4N$, $\gamma$-$Fe_2O_3$, Co-modified $\gamma$-$Fe_2O_3$, and Co-modified $Fe_3O_4$, and MnAs, MnBi, and MnSb.

As noted above, a particularly outstanding species of the magnetic component which can be used in formulating the compositions of the present invention is ferromagnetic chromium oxide. This material can be used alone, i.e., in substantially pure form, or modified with one or more reactive elements. Suitable descriptions of both the process of preparation and the compositions which have the necessary properties can be found in the following illustrative list of issued U.S. Patents:

Arthur—2,956,955; Arthur and Ingraham—3,117,093; Cox—3,074,778; Cox—3,078,147; Ingraham and Swoboda—2,923,683; Ingraham and Swoboda—2,923,684; Ingraham and Swoboda—3,034,988; Ingram and Swoboda—3,068,176; Swoboda—2,923,685; Cox—3,278,263; Ingraham—2,923,685; Oppegard—2,885,365.

It is obvious that shape anisotropy, or magnetocrystalline anisotropy, can be used in the preparation of the image plates or films of the present invention to obtain a preferred orientation of the magnetic particles in the coating direction in the transverse direction, or perpendicular to the surface of the film.

The nature of the support in and/or on which the magnetizable stratum is positioned can vary widely through such a range as from glass to flexible polymers, including in the intervening areas, paper, cardboard, wood, and the like. Because of the easier and wider handlability, and therefore greater desirability, the preferred substrates are the flexible polymeric ones.

The support may be separate from the magnetizable material or may actually contain the same. The thickness of stratum to be magnetized including magnetizable species and binder is controlled by the bit size. For maximum resolution, i.e., fidelity of reproduction, this stratum should be of the order of minimum bit size, e.g., 0.01–5.0, and most preferably 0.05 to 0.5 mil thick. The thickness of the flexible substrate is generally in the range 0.1–25 mils. The most usual thicknesses are in the range 0.2–20.0 mils and especially preferred are thicknesses in the range 0.5–2.0 mils. Any flexible material can be employed for the substrate including mica and the commercially available flexible glass substrate known in the trade as ribbon glass, and preferably a synthetic polymer.

The primary requisites for the binder matrices when used are that:

(1) They be nonreactive with the magnetic material, i.e., the working component, and (2) They be thermally stable to reasonable levels, i.e., at least as high as the Curie temperature of the magnetic materials, for short (milliseconds) periods, and stable to the exposing radiation.

As stated previously, the present pyromagnetic read-out technique can be applied to any magnetic record, whether it be by conventional magnetic recording head or by any of the previously described demagnetizing, magnetizing, or magnetic reverse polarization techniques. The latter three are normally preferred since operating with imagewise energy means, e.g., the equivalent of electron beams, laser beams, and the like, these read-in means permit the attainment of a magnetic image at a much higher packing factor than possible using conventional magnetic recording heads. This is especially important since the main feature of the pyromagnetic read-out is the capability of reading-out with a high packing density.

The following examples are submitted to illustrate further the present invention but not to limit it.

EXAMPLE 1

This example illustrates the activation of a magnetic pick-up head by means of nondestructive heating of a magnetized spot to a temperature approaching, but not exceeding, its Curie temperature.

A piece of uniformly magnetized $CrO_2$ tape (see Example 7) was placed in close contact with a magnetic playback head (Nortronix Model SLFH3L; see FIG. 2) and exposed to the attenuated radiation from a ruby laser (Hughes Aircraft Corp. Model 302, with power supply Model 260). The power input to the laser flash lamp was 1200 joules. The diameter of the unfocussed laser beam was about 6 mm. The beam was attenuated with a neutral density filter such that the energy density of the beam falling on the $CrO_2$ tape was less than 0.25 joule/cm.$^2$. The induced electrical signal due to magnetic flux changes as sensed by the magnetic head was amplified 100 times with a Keithley wideband amplifier Model 104, and displayed on an oscilloscope, a Tektronix Type 561A, with type 3A72 plug in amplifier and type 3B3 time base. When the signal-to-noise ratio was low, a frequency filter (Krohn-Hite, Model 315A) was used to suppress the noise level. A band pass of 0.2–10 k.c.p.s. was used with a laser pulse width of about 800 $\mu$sec.

Maintaining the laser radiation intensity constant with the temperature of the irradiated tape below the Curie temperature of the $CrO_2$, the induced electrical signal was repeatedly obtained from the same spot of the tape without any noticeable change in magnitude. When the direction of magnetization of the tape was reversed so that the magnetic field polarity across the gap of the magnetic head was reversed, the same intensity electrical signal but with opposite polarity was obtained upon irradiation.

Similar irradiation on an unmagnetized tape used as a control gave no signal.

EXAMPLES 2–5

Tapes containing magnetic materials other than ferromagnetic chromium oxide were processed in the pyromagnetic read-out method described in Example 1.

| Ex. | Magnetic material | Manufacturer | Manufacturer's designation |
|---|---|---|---|
| 2 | $\gamma$-$Fe_2O_3$ | Memorex | M62K |
| 3 | Co-modified $Fe_2O_3$ | C. K. Williams | EX 1312 |
| 4 | do | Wright | 4231 |
| 5 | Ni/Fe film | IBM | |

Because of the much higher Curie temperatures of these materials, radiation energy densities used were as high as 0.5 joule/cm.$^2$. The pyromagnetic signals obtained on read-out were similar to those obtained with the ferromagnetic chromium oxide of Example 1.

EXAMPLE 6

This example illustrates sequential read-in and nondestructive read-out by means of an electron gun (see FIG. 3).

(A) Read-in

Another piece of the ferromagnetic chromium oxide tape of Example 1, unmagnetized, was exposed to an intensity modulated electron beam inside a vacuum system in the presence of a biasing magnetic field for recording. The electron gun used was a Superior Electronics, Inc., Model SE47M and was operated at a high negative voltage derived from a Spellman Model LAB 30 PN power supply in conjunction with a high voltage coupling amplifier (Model A100 manufactured by Litton Industries) to provide the correct voltages for the various elements of the electron gun. The electron beam was focussed with a focussing coil (Model HFL 334–260/530 made by Celco) with focussing current supplied by a Deltron regulated power supply Model RP–50–6. Deflection of the electron beam was accomplished by a Celco magnetic deflection coil (Model HAD–428–S539) powered by a Celco amplifier (Model P–DA–PP3). The twin amplifier was in turn driven by two sawtooth generators (Tektronix type 162). This equipment permits the generation of a continuous or single frame raster, or a single sweep of the electron beam.

The $CrO_2$ tape was placed in a small tape recorder acting as the tape transport. Batteries, located outside the vacuum system, were used to power the drive motor of the tape transport inside the vacuum system through electrical feedthroughs. A Nortronix type SLFH3L tape head was used to create a magnetic field with a D.C. current during recording, as well as for sensing magnetic flux changes during read-out.

The system was evacuated with an oil diffusion pump (Veeco Model EP 41W) backed by a rotary pump. All work was done at pressures below $3\times10^{-6}$ torr as monitored with thermocouple gauges and ionization gauges (Veeco Model RG3).

Coplanar with the gap of the magnetic head was an aluminum plate coated with P1 phosphor (pp. 9–141, Am. Inst. Phys. Handbook, second edition (1963), McGraw-Hill) for visual inspection of the electron beam. Also coplanar with and located close to the magnetic head were two parallel 1-mil tungsten wires 3.3 mm. apart which were isolated electrically from both the phosphor plate and the magnetic head and were used to measure the diameter of the electron beam by scanning the electron beam across the wires.

Recording was carried out by scanning one single sweep of an intensity modulated electron beam across the tape parallel to and on top of the gap of the magnet head. The electron beam was modulated by feeding a sine wave of 24 kc., 1–10 volts peak-to-peak, from a standard signal generator into the video input of the Litton A100 coupling amplifier. A D.C. current of 300 $\mu$a. (incapable of magnetizing the $CrO_2$ tape by itself) was passed through the magnet head to produce the bias magnetic field for recording. The electron beam current was about 35 $\mu$a. at 15 kv. with beam diameter 1.5±0.5 mm., scan length 2 inches, and sweep duration 1 msec. At a modulation frequency of 24 kc. there were thus 6 magnetized spots across the ¼" width of tape.

(B) Read-out

After recording, the tape head was connected to the Keithley amplifier, the output from which was displayed on an oscilloscope as described in Example 1. For read-out, a steady beam of electrons of 25–30 $\mu$a., and 15 kv. and the same sweep rate as the recording beam was used to scan the magnetized spots as recorded above and 6 electrical pulses were observed. A read-out rate twice that of recording was also demonstrated.

EXAMPLE 7

This example illustrates sequential read-in and read-out by means of a laser (see FIG. 4).

(A) Preparation of ferromagnetic chromium oxide-containing tape

A sample of single-domain, single-crystal particulate, high purity ferromagnetic chromium dioxide was prepared as described in Examples XIII, XIV, and XV of Cox, U.S. Pat. 3,278,263 and a dispersion thereof was prepared as in Example XVII, ibid., differing only in that the viscosity was 8.6 poises, and the dispersion coated on poly-(ethylene terephthalate) film, also as described in the same Example XVII.

(B) Read-in

Apparatus essentially as described in Example 1 was again used with the addition of a bar magnet 1¼" away from the gap of the tape head to serve as a constant biasing magnetic field on recording and the insertion of a rotating prism between the laser source and the magnetic tape head (see FIG. 4). The ruby laser exhibited a pulse duration of about 600 $\mu$sec. comprising a series of intensity spikes about 8–10 $\mu$sec. apart between spikes. The rotating prism at a rate of 17,500 r.p.m. scanned the laser beam, so that it was scanning along the gap of the magnetic tape head with the linear velocity of the light beam at the tape head so scanned 8.8 cm. away from the prism being 16.2 cm./msec. Thus, the above-described spiking effect was used here as the intensity modulation of the laser beam.

A piece of the unmagnetized $CrO_2$ tape described above was placed tightly against the tape head, and a biconvex lens of 20 cm. focal length was placed between the laser source and the scanner such that the beam was focussed on the tape. Glass filters were used to attenuate the beam intensity so that the $CrO_2$ tape would not be damaged by the focussed laser beams. Three to four distinct spots along the ¼" tape were exposed, with each spot corresponding to one laser spike. This periodicity was confirmed several times by counting the number of burnt spots on the tape when the attenuating filters were deliberately removed. The field strength provided by the biasing bar magnet was 70 gauss, as determined with a Bell gaussometer Model 120 (well below field strength sufficient to magnetize the $CrO_2$ alone). This read-in procedure results in 3–4 magnetized spots about 0.5 mm. in diameter.

(C) Read-out

Read-out was accomplished using the same apparatus as in read-out minus the biasing permanent magnet except that the rotating prism was scanned at a much slower rate of 3000 r.p.m. At this relatively slow rate, the laser spikes were close enough together spatially so that the laser beam could be considered pseudo-continuous. The pyromagnetic signal sensed by the tape head was amplified 100 times as in Example 1, then filtered with a frequency filter at a band pass of 10–100 kilocycles and displayed on an oscilloscope. Three pyromagnetic signals corresponding to the modulated spiked laser read-in were observed with a total duration of about 210 $\mu$sec. Since the linear velocity of the read-out laser beam at the tape head was 2.8 cm./msec., this signal duration on read-out corresponded to a scan length of 5.9 mm. These results establish the sequential recording by thermoremanent magnetization and read-out by the pyromagnetic method.

EXAMPLE 8

This example illustrates read-out by the pyromagnetic method of a signal recorded with a magnetic head.

A piece of ¼"-wide ferromagnetic chromium oxide tape was recorded with a sine wave signal of 18.6 cycles/inch with a magnetic tape recorder (Ampex FR 4450). In order to read out this recording the read-out apparatus of Example 7 was used. The recorded tape was placed in close contact with a magnetic head (Nortronix SLFH3L) having a gap length of 0.26 inch and a gap width or spacing of 0.16 mil., and a laser beam from a ruby laser was allowed to scan the tape along the gap of the magnetic head at a scan rate of $1.15\times10^3$ cm./sec. The signals from the tape head were amplified 100 times with a Keithley amplifier No. 104 and passed through a frequency filter at a band pass of 10–100 kHz. before being displayed on a cathode ray oscilloscope.

The read-out signal observed consisted of 10 pulses of alternate polarity, corresponding to the 4.8 complete sine wavelengths along the gap length.

This result demonstrated that ordinary magnetic recordings can be read-out by the pyromagnetic technique.

Since obvious modifications and equivalents in the invention will be evident to those skilled in the art, we propose to be bound solely by the appended claims.

The embodiments of the invention in which an exclusive property or privilege is claimed or defined as follows:

1. A process of information storage and non-destructive retrieval which comprises:

impressing intelligence upon a magnetic storage member, said magnetic storage member comprising a layer of hard magnetic material by forming discrete areas of differing thermally stable magnetization corresponding to said information on said layer of hard magnetic material;

rapidly heating said areas of said layer sequentially to change the temperature to a predetermined temperature below the Curie temperature of said hard magnetic material whereby the magnitude of the magnetization of the said areas is reversibly changed in sequence; and sensing the changes in magnetic field external to the magnetic recording member produced by each change of magnetization.

2. The process of claim 1 in which said intelligence is impressed on said magnetic recording member by premagnetizing said magnetic recording member and selectively and transiently heating areas of said premagnetized magnetic layer to the vicinity of the Curie temperature in the substantial absence of an external magnetic field whereby said areas are demagnetized.

3. The process of claim 2 wherein the heating of said recording member to impress intelligence thereon and the heating to change the magnitude of the magnetization thereof are accomplished by radiation.

4. The process of claim 3 in which said radiation is an electron beam.

5. The process of claim 3 in which said radiation is electromagnetic radiation.

6. The process of claim 5 in which said intelligence is impressed on said magnetic recording member by premagnetizing the said magnetic layer and selectively and transiently heating areas of said magnetic layer to the vicinity of the Curie temperature in the presence of a magnetic field directed opposite the direction in which the magnetic layer is premagnetized.

7. The process of claim 6 wherein the heating of said recording member to impress intelligence thereon and the heating to change the magnitude of the magnetization thereof are accomplished by radiation.

8. The process of claim 7 in which said radiation is electromagnetic radiation.

9. The process of claim 8 in which said radiation is an electron beam.

10. The process of claim 1 in which said intelligence is impressed on said magnetic recording member by selectively and transiently heating areas of said magnetic layer in an initially unmagnetized condition in the presence of a magnetic field.

11. The process of claim 10 wherein the heating of said recording member to impress intelligence thereon and the heating to change the magnitude of the magnetization thereof are accomplished by radiation.

12. The process of claim 11 in which said radiation is electromagnetic radiation.

13. The process of claim 11 in which said radiation is an electron beam.

14. Apparatus for the storage and non-destructive retrieval of intelligence which comprises:

(i) means to impress intelligence on a magnetic recording member comprising a layer of hard magnetic material by forming discrete areas of differing thermally stable magnetization corresponding to said intelligence on said layer of hard magnetic material;

(ii) means to rapidly heat said areas sequentially to a predetermined temperature below the Curie temperature of said hard magnetic material whereby the magnitude of the magnetization of the said areas is reversibly changed in sequence; and (iii) means to sense the changes in magnetic field external to the magnetic recording member produced by each change in magnetization.

References Cited

UNITED STATES PATENTS 3,094,699 6/1963 Supernowicz ---------- 346—74

STANLEY M. URYNOWICZ, Jr., Primary Examiner

G. M. HOFFMAN, Assistant Examiner

U.S. Cl. X.R.

117—235; 179—100.2; 250—65.1; 346—74